(12) United States Patent
Charier et al.

(10) Patent No.: US 8,042,341 B2
(45) Date of Patent: Oct. 25, 2011

(54) TURBOJET ENGINE ACCESSORY GEAR BOX DRIVESHAFT; MODULAR ADDITIONAL ACCESSORY

(75) Inventors: Gilles Alain Charier, La Grande Paroisse (FR); Patrick Charles Georges Morel, Chartrettes (FR); Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 1048 days.

(21) Appl. No.: 11/869,302

(22) Filed: Oct. 9, 2007

(65) Prior Publication Data
US 2008/0173114 A1 Jul. 24, 2008

(30) Foreign Application Priority Data

Oct. 13, 2006 (FR) ..................................... 06 54280

(51) Int. Cl.
*F02C 7/275* (2006.01)
(52) U.S. Cl. ............................... 60/788; 60/793; 60/802
(58) Field of Classification Search .................. 60/226.1, 60/788, 792–793, 802; 74/15.63, 606 R
See application file for complete search history.

(56) References Cited

U.S. PATENT DOCUMENTS

| | | | | |
|---|---|---|---|---|
| 3,714,779 A * | 2/1973 | Stein et al. | ...................... | 60/796 |
| 3,799,476 A * | 3/1974 | Bouiller et al. | ................. | 244/60 |
| 4,566,269 A * | 1/1986 | Gingras | ........................ | 60/226.1 |
| 5,143,329 A | 9/1992 | Coffinberry | | |
| 5,687,561 A * | 11/1997 | Newton | ......................... | 60/226.1 |
| 5,694,765 A * | 12/1997 | Hield et al. | ................. | 60/39.163 |
| 6,672,049 B2 * | 1/2004 | Franchet et al. | ............. | 60/226.1 |
| 2006/0248900 A1 * | 11/2006 | Suciu et al. | ..................... | 60/802 |

FOREIGN PATENT DOCUMENTS

| | | |
|---|---|---|
| EP | 1 255 023 A1 | 11/2002 |
| EP | 1 574 687 A1 | 9/2005 |
| FR | 2 882 096 | 8/2006 |
| GB | 926947 | 5/1963 |

* cited by examiner

*Primary Examiner* — Louis Casaregola
*Assistant Examiner* — Phutthiwat Wongwian
(74) *Attorney, Agent, or Firm* — Oblon, Spivak, McClelland, Maier & Neustadt, L.L.P.

(57) ABSTRACT

An accessory gear box driveshaft in a turbojet engine with intermediate casing, designed to be mounted in a radial arm of the intermediate casing is disclosed. The shaft is mechanically connected, at a first end, to a an engine shaft of the turbojet engine, and is mechanically connected, at a second end, to a gear box. The shaft includes a bevel gear between the two ends, to provide mechanical transmission to an additional accessory. This shaft is notable in that, together with the gear, it is contained in a case forming an oil circuit sealed against the arm. The accessory includes a drive shaft collaborating with the gear of the transmission shaft and forming a modular assembly therewith.

5 Claims, 3 Drawing Sheets

TURBOJET ENGINE ACCESSORY GEAR BOX DRIVESHAFT; MODULAR ADDITIONAL ACCESSORY

BACKGROUND OF THE INVENTION AND DESCRIPTION OF THE PRIOR ART

The present invention relates to the field of multispool and multiflow turbojet engines, particularly twin spool bypass turbojets. It is aimed at mounting an accessory and at the mechanical transmission between this accessory and a shaft of the engine.

To drive the accessories mounted on the engine, such as electric generators, oil pumps or fuel pumps, which are necessary to the operation of the engine or that of the aircraft on which it is mounted, the required power is generally taken off the main shaft. A twin spool turbojet engine has two coaxial shafts, one of them, known as the low-pressure or LP shaft, connecting the low-pressure compressor to the low-pressure turbine and together forming the LP spool and the other, known as the high-pressure or HP shaft, connecting the high-pressure compressor to the high-pressure turbine and together forming the HP spool. In the case of such an engine, transmission of power to the accessories is generally provided by a radial shaft, housed in an arm of the intermediate casing, one end of which has a bevel gear collaborating with a gear secured to the high-pressure spool. The other end is mechanically connected to a box containing a number of gears and forming a support for the accessories while at the same time providing them with drive. When the engine is a bypass engine, the radial transmission shaft passes through both the primary flow and the bypass flow streams, respectively, because the accessory gear box, also known by its English-language acronym AGB, is mounted on the casing of the fan that generates the bypass flow.

Because of evolutions in engine design and engine operating conditions, proposals have been made to mount additional pieces of equipment on the primary flow casing to engage with the radial accessory driveshaft between the two ends thereof. Such pieces of equipment may, for example, consist of a motor for driving the radial transmission shaft, to supplement the drive from the HP spool. Such supplementing is actually useful when the engine layout means that a great deal of power is demanded when this engine is running at idle, in order to drive certain accessories such as electric generators. At idle speed, the HP spool may be unable satisfactorily to supply all the power required in such a design.

SUMMARY OF THE INVENTION

The present invention is therefore concerned with mounting an accessory or additional piece of equipment on the engine casing, in a position somewhere between the two ends of the radial transmission shaft, and with the arrangements relating to the radial transmission shaft.

According to the invention, a turbojet engine comprising an intermediate casing with an accessory gear box driveshaft mounted in a radial arm of the intermediate casing, said shaft being connected, at a first end, to a means of mechanical transmission to an engine shaft of the turbojet engine and, at a second end, to a means of mechanical transmission to said box and comprising a bevel gear between the two ends so as to provide mechanical transmission to an additional accessory, is notable in that the shaft, with said gear, is contained inside a case that forms an oil circuit that is sealed against said arm.

The driveshaft structure according to the invention has the advantage of avoiding oil leaks and thus limiting fire zones. This is particularly advantageous when the structure of the intermediate casing comprises an attached outer shell ring, the number of bolted components generally increasing the risks of oil leaks.

According to a preferred embodiment, the case comprises a casing for the gear and two sheaths for those parts of the shaft that lie one on each side of the gear.

The invention applies in particular to the case where the transmission shaft is made in three cylindrical parts fitting one into the next, with a first cylindrical element on which the gear is mounted and two cylindrical shaft elements extending the first cylindrical element one on each side thereof.

According to another feature of the invention, the accessory comprising a drive shaft collaborates with said gear of the shaft and is designed to form a modular assembly therewith. This layout is particularly advantageous because it simplifies factory assembly of the accessory and maintenance thereof, and allows the accessory to become interchangeable. The tricky assembly and adjustment of the bevel pair can thus be performed accurately outside the turbojet engine where space is tight and generally cluttered. When it is mounted on the turbojet engine, all that remains to be done is for the various cylindrical elements of the radial transmission shaft to be plugged together. An operation such as this does not require the use of precision tooling.

More specifically, the modular accessory comprises a support on which the gear is mounted.

The invention also relates to a bypass turbojet engine also having an intermediate casing with an auxiliary gear box driveshaft housed in a radial arm of the intermediate casing, and an additional accessory, wherein said gear is housed in a space in the radial arm that forms a boundary separating the primary flow duct from the bypass flow duct.

More specifically, the case is formed of a casing for the gear housed in said space in the radial arm and of two sheaths for those parts of the shaft that are located one on each side of the gear.

BRIEF DESCRIPTION OF THE DRAWINGS

One nonlimiting embodiment of the invention is now described with reference to the attached drawings in which.

DESCRIPTION OF THE PREFERRED EMBODIMENT

Figure 1:
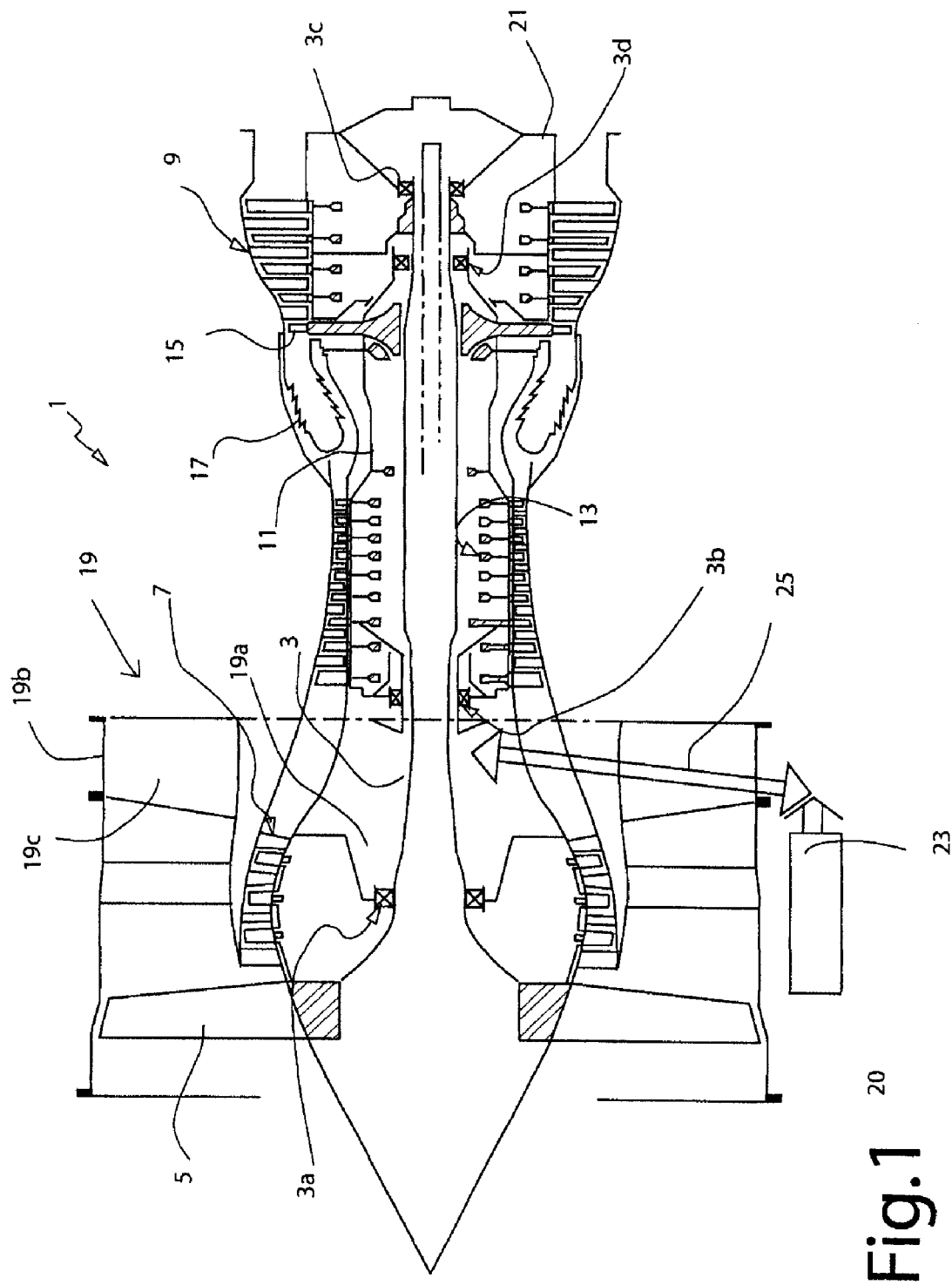
FIG. 1 shows, in axial section, an overview of a twin spool bypass turbojet engine to which the invention may be applied.

FIG. 1 schematically depicts a twin spool bypass turbojet engine with its various main components. It comprises a first shaft 3 connecting, to the left in the figure, a fan rotor 5 and the first compressor stages 7 to the low-pressure turbine 9; the assembly forms the low-pressure or LP spool. Coaxial with the first shaft, a drum-shaped second shaft 11 connects the high-pressure compressor stages 13 of the compressor to the high-pressure turbine 15, this assembly forming the high-pressure spool HP with the combustion chamber 17. The shaft 3 is supported, at the upstream end, by the bearing 3a mounted on the casing 19 that is termed intermediate casing and, at the downstream end, by the bearing 3c mounted on the exhaust casing 21. The HP shaft here is supported by the bearing 3b of the intermediate casing 19 and at the rear by the shaft 3, via the inter-shafts bearing 3d.

The intermediate casing is made up of a hub 19a supporting the bearings 3a and 3b, of an outer shell ring 19b, provided with forward means of attachment to the aircraft and supporting the fan casing, and of radial arms 19c connecting the hub 19a to the shell ring 19b. This intermediate casing at least partially consists of a casting to which radial arms may have been attached. The accessories, such as generators and fuel or oil pumps, are mounted on a gear box 23, as is known, and which is known in the art as the AGB. This box is mounted on the outside on the fan casing at a location that allows it to be accessed for maintenance. The gears are mechanically connected to a shaft of the engine via a radial driveshaft 25 which is housed in a radial arm 19c of the intermediate casing. This driveshaft is connected to a first bevel gear at its inner radial end. This gear is in mesh with a bevel gear secured to the HP spool. The shaft 25 is also connected to a second gear at its outer radial end and this gear is in mesh with an input shaft for the set of gears in the AGB.

In operation, an engine such as this draws in air via the fan which compresses it into a primary flow which passes through the compression stages, the combustion chamber and the turbine stages, and a bypass flow which is discharged into the atmosphere having bypassed the combustion chamber. The turbines drive the compression means via the LP and HP shafts respectively.

It has been proposed for an additional accessory to be positioned in the space in the casing between the two, primary and bypass, flows. One example of such an accessory is a top-up motor which contributes to the driving of the radial transmission shaft 25 when the HP spool will not suffice. This is the case in engines in which the number of driven accessories and the power required are high at idle. A top-up motor such as this may be an air turbine, supplied with air from the primary flow.

Extending beyond this particular example, the invention applies to any additional accessory, whether this is a receiving or driving machine, housed in this space.

The problem that is encountered in this case stems in part from the lubrication the oil flow requirement for which easily exceeds the means already in place for the accessory driveshaft. The present invention aims at an arrangement to alleviate this problem.

Figure 2:
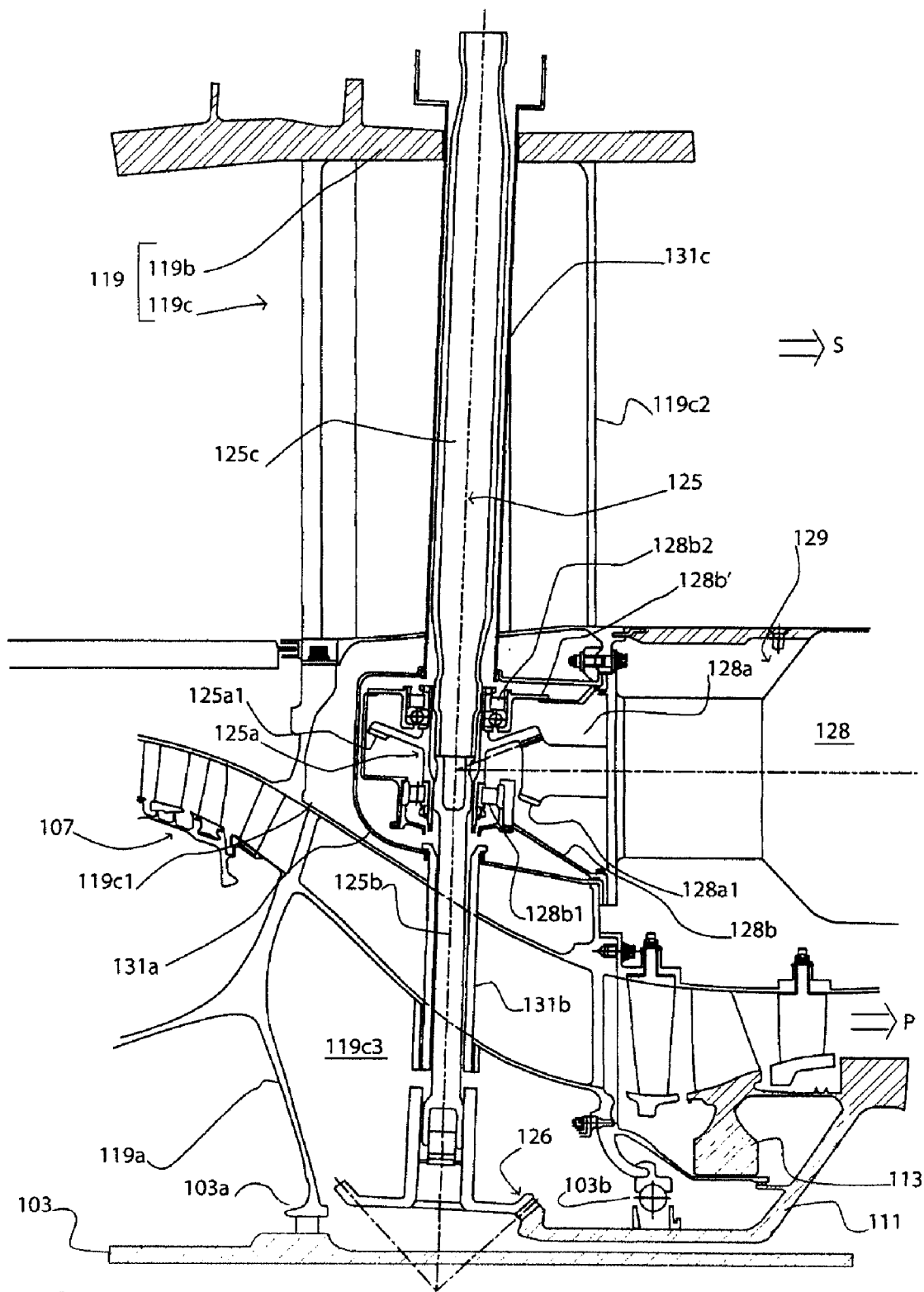
FIG. 2 shows, in axial section, a view through a radial arm of the intermediate casing in which an AGB driveshaft is housed with an additional accessory according to the invention.

FIG. 2 depicts, in axial section, a partial view of the engine at the radial transmission shaft, according to the invention.

Those components that correspond to those of FIG. 1 bear the same references increased by 100. Thus, we have an intermediate casing 119 in a radial arm 119c of which is housed the radial accessories driveshaft 125, the accessories not being visible in FIG. 2. The shaft 125 passes through the shell ring 119b of the intermediate casing and its outer radial end is mechanically connected, for example via a splined connection, to a pair of bevel gears that have not been depicted.

The arm 119c is hollow and formed of three radially distinct parts: 119c1, 119c2 and 119c3.

The part 119c3, which is aerodynamically profiled, passes through the duct for the primary flow P on one side of which can be seen part of the LP compressor 107, and on the other side of which there is the HP compressor 113. The part 119c3 of the arm 119c is adjacent to the hub 119a of the intermediate casing.

The radial arm 119c comprises a part 119c2 passing through the duct for the bypass flow S. The part 119c2 is adjacent to the shell ring 119b.

The arm comprises a part 119c1 between the first two. This part delimits a sector of the annular space which, on one side, extends the nose separating the primary and bypass flows and on the other side is itself extended by an annular space 129 between the two flows.

In the hub 119a, the bearing 103a supports the shaft 103 of the LP spool and the bearing 103b supports a journal 111 forming the upstream end of the compressor 113 of the HP spool.

The shaft 125 is housed in this radial arm of the intermediate casing. The arm 125 is made in three elements: 125a, 125b and 125c. The central first element 125a is of cylindrical shape, and hollow, and is secured to a bevel gear 125a1.

The second element 125b is push-fitted, from the radially inner side, onto the first element 125a and is held there by a splined connection. At its inner end, it is connected by a splined connection to a bevel gear pair 126 in mesh with the journal 111 of the HP spool. Thus, the element 125b is driven by the HP spool.

The third element 125c is push-fitted, from the radially outer side, onto the first element 125a and is held there by a splined connection. As has been seen, the radial end of this element is not visible in the figure. It is connected mechanically by a pair of bevel gears to the input shaft of the AGB. The rotational movement of the HP spool is thus transmitted via the transmission means, consisting of the bevel gear pair 126 and the shaft 125, to the input shaft of the AGB.

An additional accessory 128 is housed in the space formed by the engine casing between the primary flow duct and the bypass flow duct. The accessory has a movement transmission shaft 128a ending in a bevel gear 128a1. The accessory 128 is bolted onto the flank of that part 119c1 of the radial arm 119c which extends the previous annular space.

This accessory may be any accessory; it may be a motor, an air turbine, a hydraulic motor, for top-up drive to the transmission shaft 125 where necessary. It may equally be an additional receiving accessory driven by the shaft 125.

A support casing 128b is secured to the accessory casing 128. This casing 128b supports the central element 125a of the transmission shaft 125 via two bearings 128b1 and 128b2 such that the bevel gear 128a1 meshes with the bevel gear 125a1 of the element 125a to transmit rotational movement from one to the other. To facilitate assembly, the support casing 128b comprises a cover 128b' on which the bearing 128b2 is mounted.

The accessory 128 with the shaft 128a, the support casing 128b and the element 125a of the shaft 125 together form a module 130 in that this assembly can be assembled separately and mounted on the turbojet engine as a unit as will be explained later on.

The module 130 associated with the shaft 125 is isolated from the interior space of the arm 119c by a case 131.

This case consists of a casing 131a and of two sheaths 131b and 131c. The casing 131a surrounds the support casing 128b of the accessory 128 and the element 125a that this casing supports. It has three openings, one for the passage of the accessory 128 and two for the shaft elements 125b and 125c respectively.

The sheath 131b surrounds the element 125b of the shaft 125 and the sheath 131c surrounds the element 125c. Appropriate seals provide sealing between the casing 131a and the two sheaths 131b and 131c. Likewise, seals are provided at the other two ends of the two sheaths.

The casing 128b is bolted onto the wall of the arm 119c.

By virtue of this case, the oil needed to lubricate the accessory and the mechanical transmission elements can be introduced along a circuit which does not interfere with the radial arms of the intermediate casing. For example, the oil already used to lubricate the pair of bevel gears 128a1 and 125a1 is collected in the space formed between the shaft elements 125b and 125c and the sheaths 131b and 131c, respectively, so that it can be recycled.

For more effective recovery, a specially dedicated device may be installed at the lowermost point of the casing 131a, so as to return directly to the engine recovery circuit most of the oil that has been used to lubricate the bevel gear pair and its rolling bearings. A device such as this would avoid having to return to the AGB this flow of oil which may be contaminated with debris from the mechanical components of the module.

The assembling of the assembly is now described in conjunction with FIGS. 3 to 6.

Figure 3:
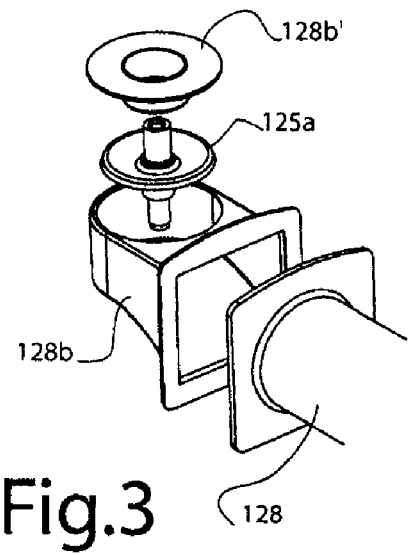
FIGS. 3 to 6 show a sequence in the mounting of the shaft according to the invention comprising an additional accessory.

FIG. 3 depicts the assembly of the module 130. The support casing 128b is fixed to the accessory 128 the shaft 128a of which cannot be seen here. Next, the element 125a of the transmission shaft 125 is introduced and the casing is closed using the cover 128b'. The bearings between the element 125a and the support casing 128b have not been depicted.

Figure 4:
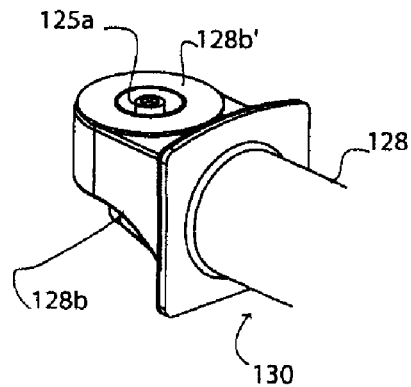

In FIG. 4, the module 130 is assembled. It will be understood that this operation can be performed in a workshop separate from the engine assembly workshop or at the supplier's. The module can be supplied assembled, this being a certain advantage because the tricky operations of adjusting the pair of bevel gears need to be carried out by specialist personnel using specialist equipment.

Figure 5:
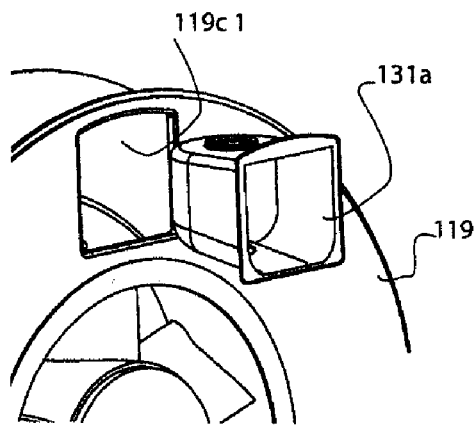

FIG. 5 shows the fitting of the casing 131a of the case 131 into the intermediate casing 119 in the housing 119c1. The radial arms 119c have not been depicted. The next step is to introduce the sheath 131b fitted with its seals from the outside through the radial openings in the casing 131a, followed by the sheath 131c equipped with its seals.

Figure 6:
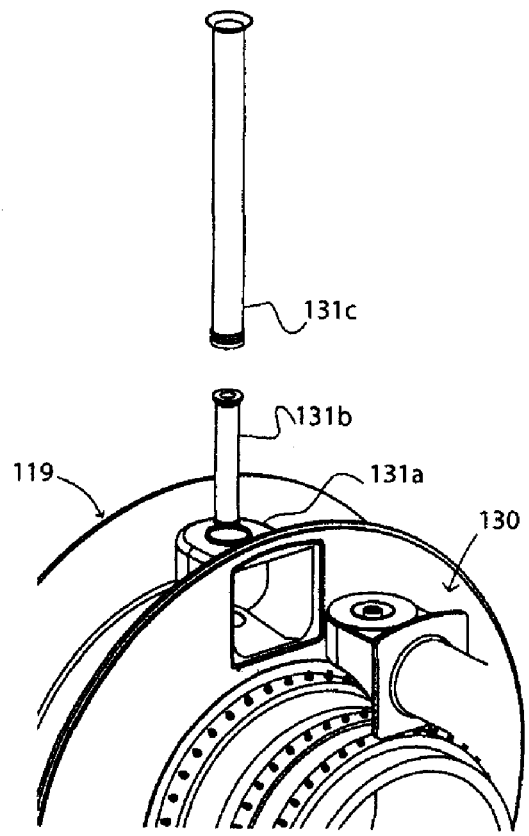

In FIG. 6, the module 130 is being introduced into the casing 131a through the axial opening of the intermediate casing 119, after the sheath 131b has been fitted. The module 130 in place prevents the sheath 131b from leaving its housing. The module 130 is then bolted onto a radial wall of the casing 119, then the mounting of this assembly is completed by fitting the two shaft elements 125b followed by 125c.

The invention claimed is:

1. A bypass turbojet engine comprising:
an intermediate casing with a hub, an outer shell ring, and a radial arm connecting the hub and the outer shell ring;
an accessory gear box driveshaft mounted in the radial arm of the intermediate casing, the driveshaft including a first central element, a second element and a third element, a first end of the second element being mechanically connected to an engine shaft of the turbojet engine and a second end of the second element being connected to the first element, a first end of the third element being mechanically connected to a gear box and a second end of the third element being connected to the first element;
a bevel gear secured to the first central element and disposed between the second and third elements;
an additional accessory with a transmission shaft being mechanically connected to said bevel gear so as to provide mechanical transmission to the additional accessory; and
a support case that supports the first central element of the driveshaft via bearings,
wherein the additional accessory, the transmission shaft, the support case, and the first element of the driveshaft form a module which is isolated from an interior space of the radial arm by a module case,
wherein the module case includes a casing which surrounds the support case and first and second sheaths which surround the second and third elements of the driveshaft, respectively, and forms an oil circuit that is sealed against said radial arm.

2. The turbojet engine as claimed in claim 1, wherein the first central element is cylindrical.

3. The bypass turbojet engine with intermediate casing as claimed in claim 1, wherein the interior space of the radial arm forms a boundary separating the primary flow from the bypass flow.

4. The bypass turbojet engine with intermediate casing as claimed in claim 1, wherein the transmission shaft includes a bevel gear which meshes with the bevel gear secured to the first central element.

5. The bypass turbojet engine with intermediate casing as claimed in claim 1, wherein seals are provided between the casing and the sheaths.

* * * * *